Aug. 14, 1923.  1,464,666
F. M. SLATER
ANTIFRICTION BEARING
Filed Nov. 29, 1921
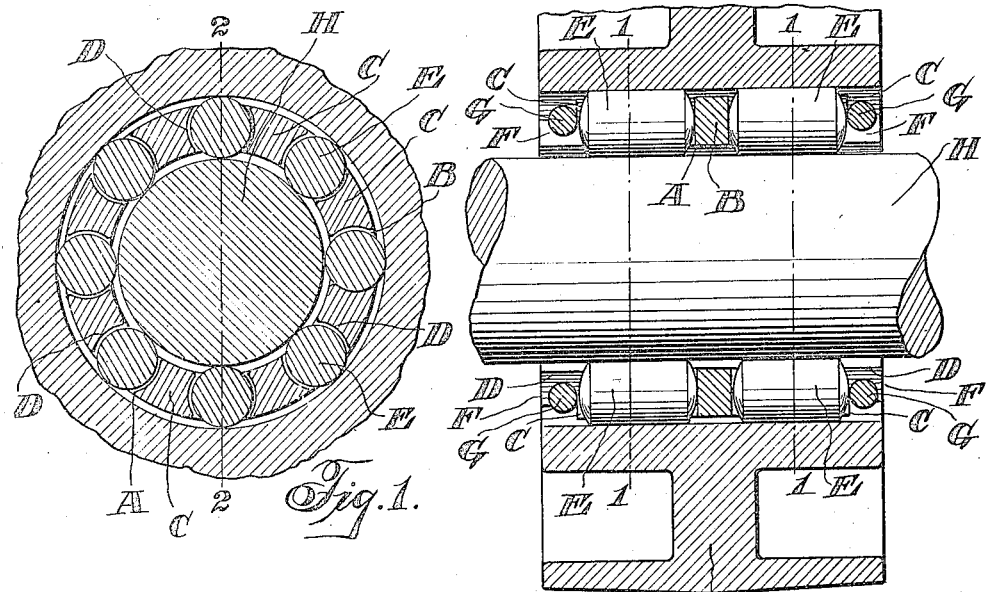
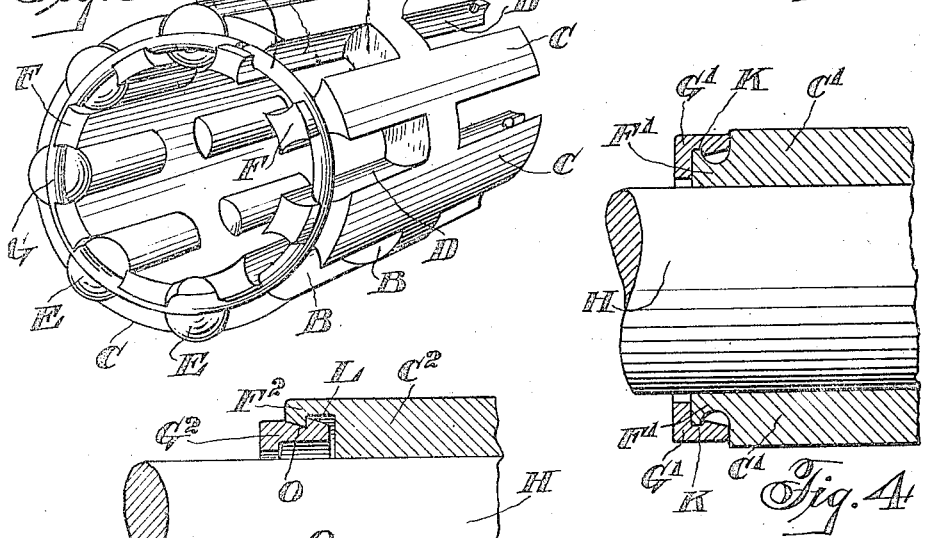
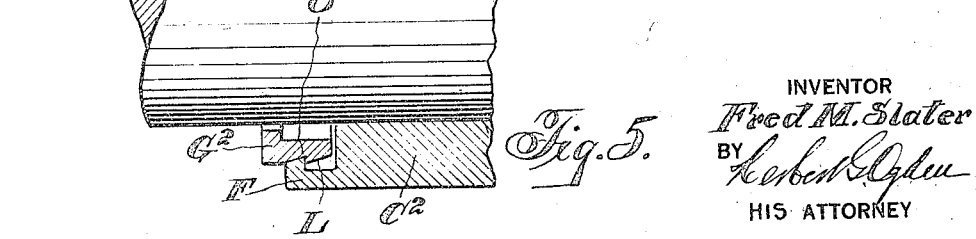
INVENTOR
Fred M. Slater
BY
HIS ATTORNEY Patented Aug. 14, 1923.

1,464,666

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

ANTIFRICTION BEARING.

Application filed November 29, 1921. Serial No. 518,620.

*To all whom it may concern:*

Be it known that I, FRED M. SLATER, a citizen of the United States, and a resident of Easton, county of Northampton, and State of Pennsylvania, have invented a certain Antifriction Bearing, of which the following is a specification, accompanied by drawings.

This invention relates to anti-friction bearings, having rollers, balls or other anti-friction members.

The objects of the invention are to improve upon such bearings by constructing the cage and cooperating retaining members in such manner that the balls or rollers or other anti-friction members may be readily removed and replaced as desired.

Other objects of the invention are to secure an anti-friction bearing which is simple, cheap to manufacture and at the same time self-contained and strong and durable.

The invention is illustrated in one of its preferred forms in the accompanying drawings in which—

Figure 1 is a transverse sectional view of a bearing on either one of the lines 1—1 of Figure 2;

Figure 2 is a longitudinal sectional view on the line 2—2 of Figure 1;

Figure 3 is a perspective view of the bearing with some of the anti-friction members removed;

Figure 4 is a detail longitudinal sectional view of a portion of a modified form of bearing, and Figure 5 is a view similar to Figure 4 of another modification.

Referring to the drawings the bearing comprises a cylindrical cage A having a central body ring B and separators or guides C extending longitudinally in opposite directions from said central ring.

The guides C are preferably formed with concave inner faces D to receive the anti-friction members shown in the drawings as rollers E.

The anti-friction rollers E are adapted to be inserted and withdrawn between the guides C longitudinally from each end of the cage, and removable retaining means are provided at each end of the cage for holding the anti-friction members in position. In one form of the invention the guides C have notched or hooked ends F with which split retaining rings G are adapted to cooperate. The bearing is shown assembled in Figure 2 on a shaft H and forms the bearing for a pulley J or other device.

In the modification shown in Figure 4 the guides C' of the cage are provided with the hooked ends F' and the retaining members are in the form of split rings G' having a rectangular or angular cross section formed with grooves K adapted to engage over the hooked ends of the guides.

In the modification shown in Figure 5 the guides $C^2$ are formed with hooked ends $F^2$ which are under cut so that the hooks face inwardly towards the shaft H and the split retaining rings $G^2$ are formed with beveled ends L and notches O adapted to engage the hooked ends $F^2$ of the guides.

I claim:

1. An anti-friction bearing comprising a cylindrical cage having a central body ring and separators or guides extending longitudinally in opposite directions from said central ring, anti-friction members adapted to be inserted and withdrawn between the guides longitudinally from each end of the cage, and removable retaining means comprising a notched ring having a beveled end at each end of the cage for holding the anti-friction members in position.

2. An anti-friction bearing comprising a cylindrical cage having a central body ring and separators or guides extending longitudinally in opposite directions from said central ring, said guides having concave inner faces, anti-friction members adapted to be inserted and withdrawn between said guides longitudially from each end of the cage, and notched retaining rings having beveled ends removably engaging the cage at the outer ends of the guides for holding the anti-friction members in position.

3. An anti-friction bearing comprising a cylindrical cage having a central body ring and separators or guides extending longitudinally in opposite directions from said central ring, said guides having concave inner faces and notched outer ends, anti-friction members adapted to be inserted and withdrawn between said guides longitudinally from each end of the cage, and split notched retaining rings having beveled ends cooperating with the notched ends of the guides to hold the anti-friction members in position.

In testimony whereof I have signed this specification.

FRED M. SLATER